United States Patent
Ikeda et al.

(10) Patent No.: US 9,148,826 B2
(45) Date of Patent: Sep. 29, 2015

(54) HANDOVER METHOD AND MOBILE TERMINAL AND HOME AGENT USED IN THE METHOD

(75) Inventors: Shinkichi Ikeda, Kanagawa (JP); Jun Hirano, Kanagawa (JP); Takashi Aramaki, Osaka (JP)

(73) Assignee: PANASONIC INTELLECTUAL PROPERTY COPORATION OF AMERICA, Torrance, CA (US)

(*) Notice: Subject to any disclaimer, the term of this patent is extended or adjusted under 35 U.S.C. 154(b) by 686 days.

(21) Appl. No.: 13/126,375

(22) PCT Filed: Nov. 6, 2009

(86) PCT No.: PCT/JP2009/005915
§ 371 (c)(1),
(2), (4) Date: Apr. 27, 2011

(87) PCT Pub. No.: WO2010/052920
PCT Pub. Date: May 14, 2010

(65) Prior Publication Data
US 2011/0211558 A1    Sep. 1, 2011

(30) Foreign Application Priority Data
Nov. 7, 2008   (JP) ................................. 2008-286448

(51) Int. Cl.
*H04W 4/00* (2009.01)
*H04W 36/00* (2009.01)
*H04W 80/04* (2009.01)

(52) U.S. Cl.
CPC ........ *H04W 36/0011* (2013.01); *H04W 80/045* (2013.01)

(58) Field of Classification Search
CPC ............. H04W 80/04; H04W 36/00–36/0022;
H04W 80/06; H04W 36/005; H04W 36/38;
H04W 8/02; H04W 8/08; H04W 8/087;
H04W 8/26; H04W 8/28
USPC ........................... 370/310–350; 455/436, 439
See application file for complete search history.

(56) References Cited

U.S. PATENT DOCUMENTS

2005/0099976 A1*   5/2005   Yamamoto et al. ........... 370/331
2007/0086382 A1*   4/2007   Narayanan et al. ........... 370/331
(Continued)

FOREIGN PATENT DOCUMENTS

JP    2005-073271    3/2005
WO    2008/029950    3/2008

OTHER PUBLICATIONS

International Search Report dated Dec. 8, 2009.
(Continued)

*Primary Examiner* — Jeffrey M Rutkowski
*Assistant Examiner* — Kenan Cehic
(74) *Attorney, Agent, or Firm* — Dickinson Wright PLLC

(57) ABSTRACT

Disclosed is a technique to provide a handover method that can improve the communication efficiency by reducing tunnel overhead between a mobile node and a home agent. When the mobile node (UE) (107) performs handover (HO) from a first access router (104) to a second access router (105) and if the IP versions supported by the networks before and after the HO are different, the UE transmits a first message including an allocation request for a home address of the HO target to the home agent (HA) and a second message including an address allocation request. The HA transmits to the UE, a third message including the home address of the HO target based on the allocation request and transmits to the UE, a fourth message including the home address based on the address allocation request.

14 Claims, 7 Drawing Sheets

(56) References Cited

U.S. PATENT DOCUMENTS

2008/0095114 A1* 4/2008 Dutta et al. ............... 370/331
2008/0137615 A1* 6/2008 Park et al. ................. 370/332
2009/0257401 A1* 10/2009 Hirano et al. ............. 370/331

OTHER PUBLICATIONS

3GPP TS 23.402 V8.2.0, "3rd Generation Partnership Project; Technical Specification Group Services and System Aspects; Architecture enhancements for non-3GPP accesses (Release 8)," Jun. 2008, pp. 136-139.

H. Soliman, "Mobile IPv6 Support for Dual Stack Hosts and Routers draft-ietf-mext-nemo-v4traversal-05.txt," Jul. 14, 2008, pp. 1-48.
C. Perkins, "IP Mobility Support for IPv4," IETF RFC3344, Aug. 2002, pp. 1-99.
D. Johnson, et.al., "Mobility Support in IPv6," IETF RFC3775, Jun. 2004, pp. 1-165.
H. Soliman, "Mobile IPv6 Support for Dual Stack Hosts and Routers draft-ietf-mext-nemo-v4traversal-06.txt," Nov. 3, 2008, pp. 1-51.
U. Narayanan, et al., "Signaling Cost Analysis of Handoffs in a Mixed IPv4/IPv6 Mobile Environment," IEEE Communications Society, IEEE GLOBECOM, 2007, pp. 1792-1796.
Chinese Office Action dated Jul. 1, 2013.

* cited by examiner

HANDOVER METHOD AND MOBILE TERMINAL AND HOME AGENT USED IN THE METHOD

TECHNICAL FIELD

The present invention relates to a handover method in a communication system performing communication while moving between networks supporting different IP versions, and a mobile terminal and a home agent (location management server) used in the method.

BACKGROUND ART

In a conventional mobile communication system, Mobile IPv4 (MIPv4) and Mobile IPv6 (MIPv6) are available as mobility management protocols for mobile nodes performing Internet protocol communication (IP communication). These techniques are disclosed in detail in the following Non-Patent Document 1 and Non-Patent Document 2. In order to make MIPv6, which originally operates only in an access network supporting IPv6, operable in an access network supporting IPv4 only as well, Dual Stack Mobile IP (DSMIP) is available, the detailed technique of which is disclosed in Non-Patent Document 3.

Using the MIPv6 protocol based on Non-Patent Document 2, a mobile node registers an IPv6 home address (HoAv6) and an IPv6 care-of address (CoAv6) with a home agent (location management server) and the home agent manages a relationship (binding) between these addresses. Herein, all messages are based on the IPv6 protocol and can be used only from an access network supporting IPv6. The DSMIP is obtained by extending MIPv6, and when a mobile node connects with an access network supporting IPv4 only, an IPv4 care-of address (CoAv4) acquired from the access network is bound with HoAv6, thus enabling communication using HoAv6 from the access network supporting IPv4 only as well.

Provided that the home agent has an IPv4 address, the DSMIP further enables the exchange of a binding control message (Binding Update (BU) or Binding Acknowledge (BA)) based on MIPv6 by encapsulation with an IPv4 header including an address field with CoAv4 and an IPv4 address of the home agent described therein or enables the communication with a correspondent node (CN) having an IPv4 address only by allocating the IPv4 home address (HoAv4) to a mobile node.

The following Patent Document 1 also discloses another method enabling binding management based on MIPv6 for a mobile node connecting with an access network supporting IPv4 only. A handover method using a similar technique is under review in a mobile communication system using mobile phones as well. In the following Non-Patent Document 4, a handover method is disclosed using DSMIP from a 3GPP access network (e.g., LTE) to a non-3GPP access network (e.g., wireless LAN network system, WiMAX network system or a 3GPP2 network system).

PRIOR ART DOCUMENT

Patent Document

Patent Document 1: Japanese Patent Application Publication No. 2005-73271 (Abstract)

Non-Patent Document

Non-Patent Document 1: C. Perkins "IP Mobility Support for IPv4", IETF RFC3344 August 2002

Non-Patent Document 2: D. Johnson, C. Perkins, J. Arkko "Mobility Support in IPv6", IETF RFC3775 June 2004

Non-Patent Document 3: Hesham soliman "Mobile IPv6 Support for Dual Stack Hosts and Routers", draft-ietf-mext-nemo-v4traversal-05.txt July 2008

Non-Patent Document 4: "Architecture enhancements for non-3GPP accesses (Release8)", 3GPP TS23.402 V8.2.0 p. 136-139 June 2008

In the above-stated prior art, a mobile node simply detects a home link targeted for IPv6 home prefixes to which the home address HoAv6 belongs. That is to say, a home link using an IPv4 address is not detected, and even when a subnet of an IPv4 address (corresponding to CoAv4) acquired from an access network is identical with the subnet of the HoAv4, such an access network is not considered as the home link unless the IPv6 prefix acquired from the access network is identical with the IPv6 home prefix.

Thus, even when the access network can be practically the home link in terms of the IPv4 subnet, a mobile node using HoAv4 has to add an extra IPv4 tunnel header to every packet (binding control message, user data). This leads an increase in header overhead, causing the problem in deterioration of communication efficiency especially in a wireless communication system where a plurality of mobile nodes shares a limited communication bandwidth.

Referring to FIG. 1 and FIG. 7, problems in the conventional mobile communication systems are described in detail. FIG. 1 shows an exemplary configuration of a mobile communication system using DSMIP, where an access network 101 supporting IPv6, an access network 102 supporting IPv4 only and a core network 103 connectable via these access networks are disposed. The access networks are provided with access routers AR 104 and AR 105, respectively, and these access routers may be an IPv6 router or an IPv4 router depending on the operation of the access network system.

The core network 103 is provided with a home agent HA 106 based on DSMIP. A mobile node UE 107 connects with the HA 106 via the access network 101 to acquire an IPv6 home address (HoAv6), and then moves to the access network 102 and carries out handover processing.

FIG. 7 is a sequence chart to describe an example of the conventional handover processing procedure. When the mobile node UE 107 detects handover to the access network 102 (Step S701) being initiated, the UE 107 starts attach processing (Step S702). The attach processing includes connection authentication processing (Step S703) by an authentication server HSS/AAA 701, and when connection is permitted, the attach processing is completed. Subsequently, the UE 107 acquires an IPv4 address (IPv4 address allocation request, IPv4 address allocation: Step S704) using a DHCP protocol or the like and transmits a binding request message (Binding Update: BU) to register the IPv4 address as a care-of address (CoAv4) and HoAv6 acquired beforehand with the HA (Step S705).

At this time, the UE 107 uses the BU to perform an IPv4 home address (HoAv4) allocation request according to the DSMIP protocol. When receiving the BU with the HoAv4 allocation request, the HA 106 registers a set of HoAv6 and CoAv4 in a binding cache, and provides indication to the UE 107 using a binding response message (Binding Acknowledge: BA) for allocation of HoAv4 (Step S706), while registering a set of HoAv4 and CoAv4 to the binding cache.

Herein, the UE 107 compares the acquired HoAv4 with the CoAv4 in their subnet parts during home link detection (Step S707) in terms of an IPv4 subnet, which is conventionally not performed. As a result, when HoAv4 and CoAv4 are identical in the subnet part, the access network 102 can be considered as the home link in terms of IPv4, and there is no need to assign a redundant IPv4 tunnel header to a packet exchanged with the HA 106.

If they are not identical in the subnet part, since the access network 102 is not a home link, an IPv4 tunnel header has to be assigned to every packet exchanged with the HA 106. Conventionally since the home link detection is not performed in terms of IPv4, an IPv4 tunnel header is assigned to every packet exchanged with the HA 106.

Preferably, the header overhead should be reduced without assigning an IPv4 tunnel header in all cases. Since the link between a mobile node and an AR is configured as a point-to-point link in typical wireless communication systems, it is possible to allocate IPv4 addresses belonging to different subnets to each of the mobile nodes even when one AR accommodates a plurality of mobile nodes.

A mobile node may perform key update processing as shown in FIG. 7 with the HA after the acquisition of CoAv4 and before the BU transmission. For instance, in the case of a mobile node not supporting dynamic key update, key updating has to be carried out every time when the care-of address is changed. The key update requires long-time processing involving encryption calculation in both of the mobile node and the HA, and therefore a considerable time is required before the mobile node is ready for actual transmission/reception of a packet after the home link detection in terms of IPv4.

SUMMARY OF THE INVENTION

In view of the above-stated problems, it is an object of the present invention to provide the following handover method, and a mobile node and a home agent used in the method. That is, when a mobile node having an IPv6 home address only detects handover to an access network supporting IPv4 only in a mobile communication system using DSMIP, an IPv4 home address is acquired during handover processing via a handover source access network, and the acquired IPv4 home address is allocated to the mobile node in the handover target access network. Thereby, the handover target access network can be a home link, and tunnel overhead between the mobile node and the home agent can be reduced so that communication efficiency can be improved. Further, even when the mobile node performs key update processing, binding processing can be completed before the key update processing. Therefore a packet can be transmitted/received without waiting for the completion of the key update processing as a time-consuming process.

In order to fulfill the above-stated object, the present invention provides a handover method for a mobile node moving between at least two networks each supporting a unique and different IP version as a protocol of the mobile node. The handover method includes the steps of: when the mobile node performs handover from a first access router in a network currently connecting before handover to a second access router in another network as a handover target, and when an IP version supported by the target network for the handover and an IP version supported by the network before handover are different, a step where the mobile node transmits a first message to a home agent via the first access router, the first message including an allocation request for a home address in the target network for the handover, and transmits a second message via the second access router, the second message including an address allocation request; and a step where the home agent transmits a third message to the mobile node based on the allocation request for a home address included in the first message, the third message including a home address in the target network for the handover, and transmits a fourth message to the mobile node based on the address allocation request, the fourth message including the home address. With this configuration, tunnel overhead between the mobile node and the home agent can be reduced so that communication efficiency can be improved. Further, even when the mobile node performs key update processing, binding processing can be completed before the key update processing. Therefore a packet can be transmitted/received without waiting for the completion of the key update processing as a time-consuming process.

The present invention further provides a mobile node performing handover between at least two networks each supporting a unique and different IP version as a protocol of the mobile node. The mobile node includes: when the mobile node performs handover from a first access router in a network currently connecting before handover to a second access router in another network as a handover target, a determination unit that determines as to whether an IP version supported by the target network for the handover and an IP version supported by the network before handover are different or not; a message generation unit that, when it is determined that the IP versions are different, generates a first message including an allocation request for a home address in the handover target and a second message including an address allocation request; a transmission unit that transmits the generated first message to a home agent via the first access router and transmits the second message via the second access router; and a reception unit that receives, based on the allocation request for a home address included in the first message, a third message including a home address in the target network for the handover and transmitted from the home agent, and receives a fourth message including the home address transmitted by the home agent based on the address allocation request included in the second message. With this configuration, tunnel overhead between the mobile node and the home agent can be reduced so that communication efficiency can be improved. Further, even when the mobile node performs key update processing, binding processing can be completed before the key update processing. Therefore a packet can be transmitted/received without waiting for the completion of the key update processing as a time-consuming process.

The present invention further provides a home agent of a mobile node, the mobile node performing handover between at least two networks supporting a unique and a different IP version as a protocol of the mobile node. The home agent includes: when the mobile node performs handover from a first access router in a network currently connecting before handover to a second access router in another network as a handover target, and when an IP version supported by the target network for the handover and an IP version supported by the network before handover are different, a reception unit that receives, from the mobile node, a first message including an allocation request for a home address in the target network for the handover and a second message including an address allocation request; a message generation unit that generates a third message including a home address in the handover target based on the allocation request for a home address in the first message and a fourth message including the home address based on the address allocation request; and a transmission unit that transmits the generated third and fourth messages to the mobile node. With this configuration, tunnel overhead between the mobile node and the home agent can be reduced so that communication efficiency can be improved. Further, even when the mobile node performs key update processing, binding processing can be completed before the key update processing. Therefore a packet can be transmitted/received without waiting for the completion of the key update processing as a time-consuming process.

According to the handover method and the mobile node and the home agent used in the method of the present invention, tunnel overhead between the mobile node and the home agent can be reduced so that communication efficiency can be improved. Further, even when the mobile node performs key update processing, binding processing can be completed before the key update processing. Therefore a packet can be transmitted/received without waiting for the completion of the key update processing as a time-consuming process.

DESCRIPTION OF EMBODIMENTS

Figure 1:
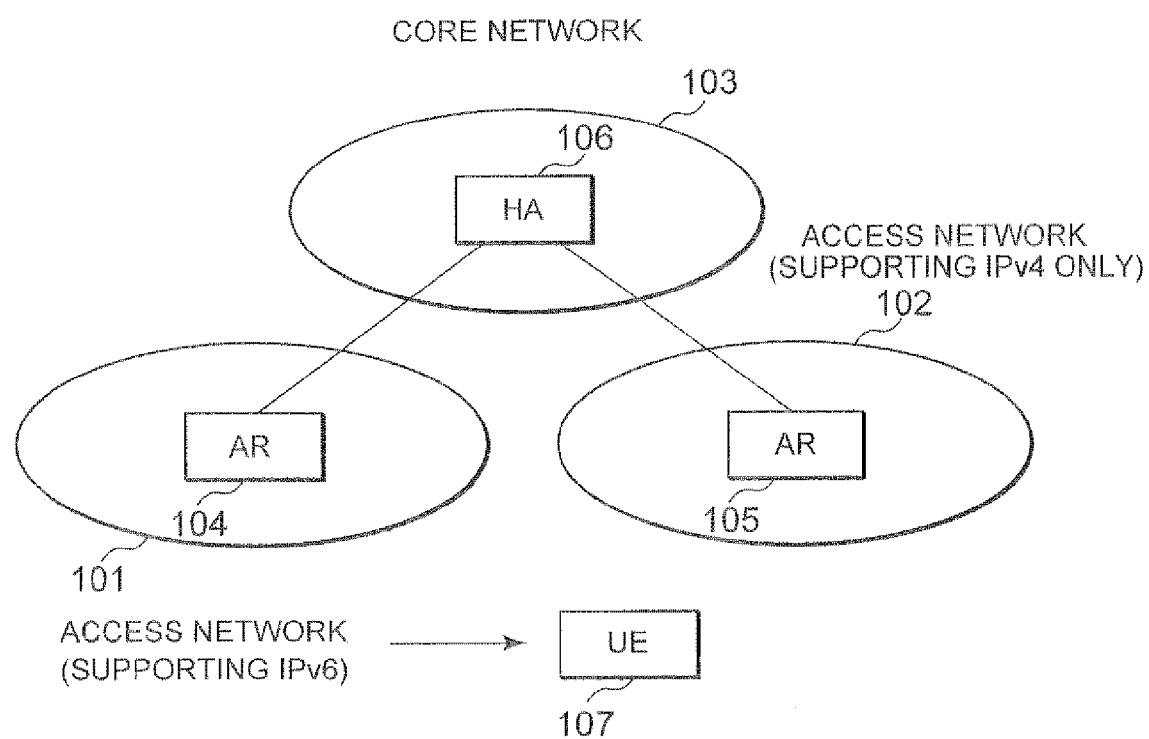
FIG. 1 shows an exemplary configuration of a communication system in one embodiment of the present invention.

The following describes a detailed operation in one embodiment of the present invention. FIG. 1 shows the system configuration of the present invention, where an access network 101 supporting IPv6, an access network 102 supporting IPv4 only and a core network 103 to which mobile node connects via these access networks are disposed. The access networks are provided with access routers AR 104 and AR 105, respectively, and these access routers may be an IPv6 router or an IPv4 router depending on the operation of the access network system.

More specifically, the access routers may be called an access gateway (AGW), a mobility anchor gateway (MAG), a packet data gateway (PDG, enhanced packet data gateway: ePDG), a serving gateway (SGW), a serving GPRS serving node (SGSN) or the like depending on the specifications the access networks use. The core network is provided with a home agent (HA) according to DSMIP, and this HA may be called a packet data network gateway (PDN GW), a gateway GPRS serving node (GGSN) or the like depending on the specifications the core network uses.

In FIG. 1, the mobile node UE 107 connects with the HA 106 via the access network 101 to acquire an IPv6 home address (HoAv6) and then moves to the access network 102 and carries out handover processing.

Figure 2:
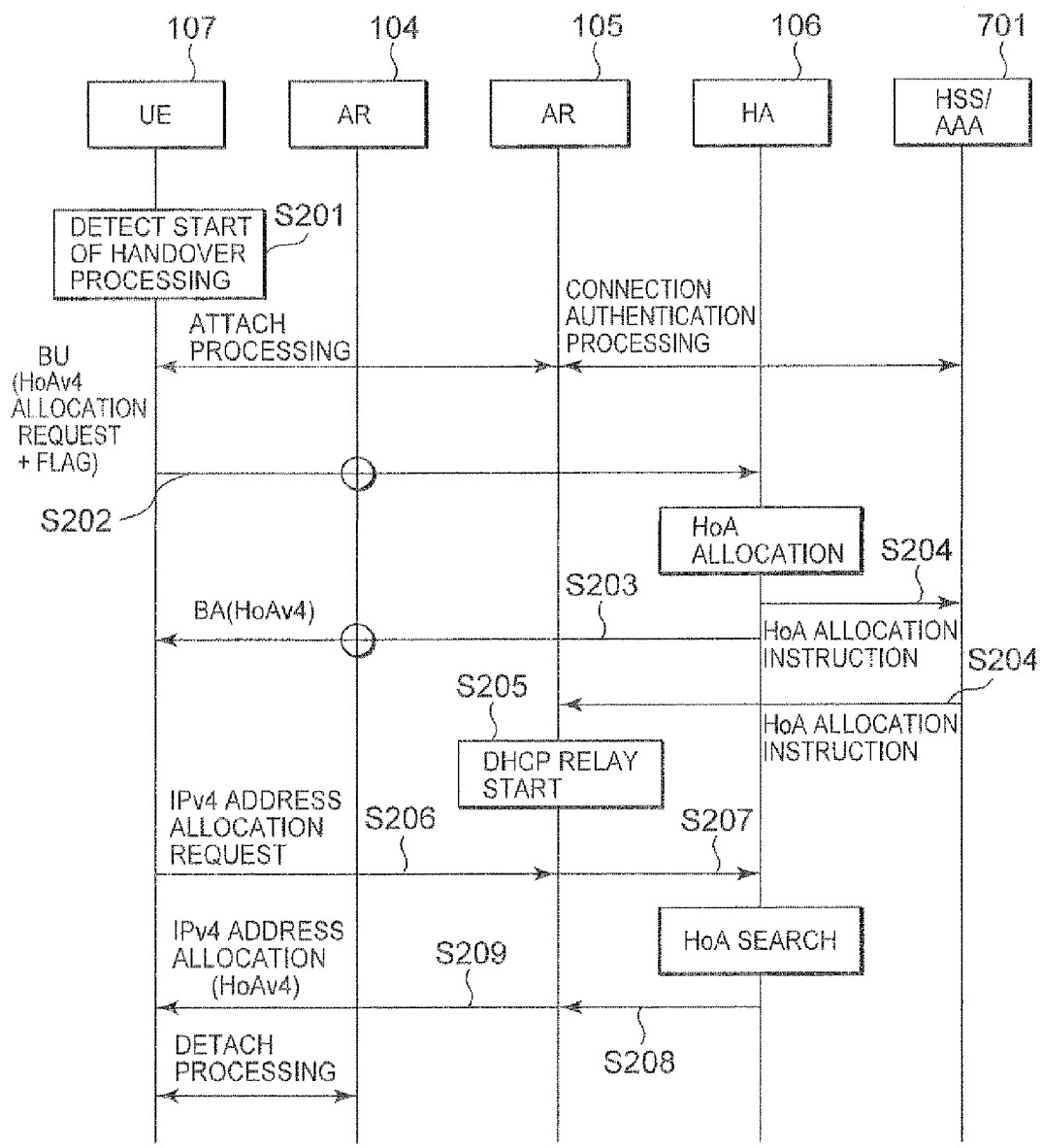
FIG. 2 is a sequence chart to describe an exemplary handover method in one embodiment of the present invention.

FIG. 2 is a sequence chart to describe an exemplary handover method in one embodiment of the present invention. When the mobile node UE 107 detects handover to the access network 102 (Step S201), the UE 107 detects that the access network 102 is a network supporting IPv4 only. The supported IP version may be detected during the attach processing to the access network 102 or at a time after the completion of the attach processing and before the IP address acquisition based on DHCP, and the UE 107 can receive a benefit of fast home link detection by detecting the IP version supported at least prior to the acquisition of an IP address.

Herein, a method carried out by the UE 107 of detecting an IP version supported includes the following. As one method, a database describing a correspondence between access networks and IP versions supported may be used for search. Access networks may be identified by using identifiers unique to the access networks, using identifiers such as a SSID or a base station ID that an access point advertises in a beacon signal, or when an identifier (IP address) of the access router can be acquired prior to handover, using such an identifier. The database may be acquired from a server on the network beforehand or the UE 107 may configure its own database from a history of connections to various access networks.

As another method, detection can be performed when a response cannot be received within a certain time period after the transmission of a Router Solicitation (RS) message for IPv6 address acquisition immediately after the completion of the attach processing. As still another method, detection can be performed when a packet on the link is monitored immediately after the completion of the attach processing and an IPv6 packet cannot be detected. Further, detection can be performed when indication of the IP version supported is provided from the network during the attach processing but an instruction is provided to acquire the IP address based on DHCP, or when just an instruction is provided to acquire an IP address based on DHCP without any notice on the IP version to be provided.

That is, the UE 107 determines (detects) a difference or not in IP versions supported based on at least any one of: the information of a predetermined database storing the association of access networks with IP versions supported by the access networks; the information on the presence or not of the receipt of a response to a predetermined message (e.g., a RS message for IPv6 address acquisition); the information on a predetermined packet (IPv6 packet) detected or not; and the information on the presence or not of an instruction to acquire an IP address from DHCP.

When detecting that the access network 102 is a network supporting IPv4 only, the UE 107 transmits a BU (first message) to the HA 106 via the source access network 101 of the handover (Step S202). At this time, the BU includes a HoAv4 allocation request. The BU further may include information (e.g., a flag (hereinafter called flag X)) indicating that UE 107 is performing handover and instructing to set the IPv4 address to be allocated to the UE 107 in access network 102 of the handover target as the HoAv4 to be allocated later. Instead of the flag X, indication of information on the access network 102 (e.g., an identifier of the access network such as SSID, an identifier of an access point and an PLMN identifier) is provided to the HA 106 using the BU, and the HA 106 detects the IP version supported by the access network 102 based on a database or the like, and when it is detected that IPv4 only is supported, the same operation as in the case of the flag X added to the BU may be carried out.

When receiving the BU including the HoAv4 allocation request (and the above flag X) via the access network 101, the HA 106 transmits a BA (third message) including the HoAv4 to be allocated to the UE 107 (Step S203), and instructs via the HSS/AAA 701 the AR 105, to which the UE 107 tries to perform the attach processing or has already started the attach processing, to transfer an address allocation request (e.g., based on a DHCP protocol) issued from the UE 107 to the HA 106 (HoA allocation instruction: Step S204). Herein, this instruction may be transmitted directly to the AR 105 not via the HSS/AAA 701 or may be transmitted to the AR 105 via a node other than the HSS/AAA 701.

When address acquisition/allocation is performed based on DHCP, the AR 105 receiving the instruction enables a DHCP relay function (DHCP relay start: Step S205). The UE 107 receives the BA and acquires the HoAv4. Alternatively, the HA 106 may instruct the AR 105 receiving a DHCP request to start a PMIP protocol and transmit a PBU to the HA 106. This enables communication using a standard PMIP tunnel that is used in the specifications such as 3GPP. Herein, the HA 106 may select either DHCP or PMIP depending on the network, and capability and the subscription context of the UE 107 or for the purpose of reducing the load on processing by a network apparatus.

At this time, if the UE 107 has not started yet the attach processing to the access network 102, the UE 107 starts the attach processing. When an IP address is allocated in the attach processing, the HSS/AAA 701 instructs the AR 105 to allocate the HoAv4 which was provided from the HA 106. When the attach processing by the UE 107 is completed but an IP address cannot be acquired, as shown in FIG. 2, an address allocation request message (IPv4 address allocation request) based on DHCP, for example, is transmitted to the AR 105 of the access network 102 (Step S206).

When receiving the address allocation request message, the AR 105 transfers the address allocation request message to the HA 106 in accordance with the instruction that has been received in advance from the HA 106 via the HSS/AAA 701 (Step S207). The HA 106 identifies the address allocation request message from the UE 107 and transmits an address acquisition response message (IPv4 address allocation (HoAv4)) with the HoAv4 allocated in advance via the access network 101 described therein to the AR 105 (Step S208), and the AR 105 transfers the address acquisition response message to the UE 107 (Step S209).

Note here that the HA 106 can identify that the received address allocation request message is from the UE 107 as follows. The AR 105 associates the identifier (e.g., Network Access Identifier: NAI) of the UE 107 acquired during the attach processing with a communication bearer (in 3G access system, a bearer ID is allocated) established by the attach processing and stores such association. Since the address allocation request message transmitted by the UE 107 is transferred on the communication bearer established by the attach processing, the AR 105 can identify that the received address allocation request message is transmitted from the UE 107 and acquires the identifier (e.g., NAI) of the UE 107 stored in advance. The AR 105 transfers or transmits the address allocation request message or a PBU containing the identifier (NAI) of the UE 107 to the HA 106. A DHCP message has a "client field" to convey a NAI therein, and a PBU similarly has an option to convey a NAI. The HA 106 acquires the message with the identifier (NAI) of the UE 107 contained therein and can identify the message transmitted from the UE 107.

Thereby, the UE 107 confirms that the address allocated from the access network 102 and the subnet (or the address itself) of the HoAv4 acquired via the access network 101 are identical, that is, that the access network 102 is the home link. In the case where the flag X is included in the BU when HoAv4 is acquired before via the access network 101, the UE 107 can omit the confirmation that the access network 102 is the home link (i.e., home link detection). This can reduce the load on processing in the UE 107 and can reduce handover time.

The mobile node implementing the present invention can suspend the attach processing prior to the address allocation step, and perform HoAv4 issuance via the access network 101 (Step S202). The HA 106 provides the allocated HoAv4 via the access network 101 to the HSS/AAA 701 and the HSS/AAA 701 instructs the AR 105 to allocate the HoAv4 when the attach processing is resumed. When the IPv4 address is allocated based on DHCP in the handover target access network 102, the HSS/AAA 701 instructs the AR 105 to transfer a DHCP request from the UE 107 to the HA 106 or to activate PMIP processing to transmit a PBU to the HA 106.

When acquiring the same address as the HoAv4 from the access network 102 as well, the UE 107 transmits a BU to register the binding of HoAv6 and HoAv4 with the HA 106 in accordance with the conventional handover procedure, and receives a BA from the HA 106. Herein, when the BU for HoAv4 acquisition transmitted via the access network 101 in advance and the BA are exchanged with the HA 106, the binding of HoAv6 and HoAv4 can be generated in is the HA 106.

Thereby, the BU/BA exchange can be omitted after the access network 102 acquires the same address as HoAv4, thus the handover time can be reduced. Further, such optimization of the BU/BA exchange enables immediate transmission/reception of a packet, and therefore the advantage of reducing handover time is remarkable as compared with the case where the mobile node UE needs key update processing. This is because although the key update processing has to be performed before the BU/BA exchange (because the key update processing is to update IPsec keys to protect the BU/BA), the key update processing can be performed at any time after the completion of the handover processing by omitting the BU/BA exchange.

An indication may be provided to the HA 106 so as to instruct to allocate HoAv4 in a similar manner in every case of the following connections with an access network supporting IPv4 only by incorporating such information (e.g., a flag) in a BU for HoAv4 acquisition via the access network 101. Receiving this, the HA 106 and the HSS/AAA 701 will instruct an AR in a target access network to allocate HoAv4 during the following attach processing by the UE 107 (Step S204), and the AR performs the processing of Step S205 and following steps. Thereby, the UE 107 needs not transmit a request every time handover is performed, so that tunnel overhead between the UE 107 and the HA 106 can be always reduced then communication efficiency can be improved, and even when the UE 107 performs key update processing, binding processing can be completed before the key update processing, and packets can be transmitted/received without waiting for the completion of the time-consuming key update processing.

Since the UE 107 that can acquire the IPv4 home address from the source access network 101 during the handover process based on the present invention can know that the access network to which the UE is connecting can be the home link, the IPv4 address acquisition based on DHCP to be performed can be omitted since the same address as the already acquired IPv4 home address will be allocated. Thereby, waiting time and data processing time caused by DHCP protocol processing can be reduced, so that handover time can be reduced.

Herein, in the case where the access network 102 cannot be the home link for reasons such as a restriction on the contract between an operator managing the core network 103 and an operator managing the access network, the HA 106 cannot provide the home address allocated to the UE 107 via the access network 102. Information as to whether the access network 102 can be the home link or not (hereinafter called home link configuration capability information) may be managed by the authentication server HSS/AAA 701 or other management servers. The HA 106 may inquire of these servers about the home link configuration capability information and then acquire such information.

In the case where the HA 106 can acquire the home link configuration capability information after receiving the BU from the UE 107 via the access network 101 and before transmitting the BA, the UE 107 can acquire the correctly allocated home address even when the UE 107 performs address acquisition processing (i.e. DHCP in the attach processing) in the access network 102 immediately after the reception of the BA. However, when a server managing the home link configuration capability information is located with distance or a secure communication path has to be established for access, it may take time for the HA 106 to acquire the information.

In such a case, the home link configuration capability information cannot be acquired even during a time duration when the UE 107 receives the BA and performs address acquisition processing, and in spite of the case where the access network 102 can be the home link actually, the HA 106 cannot configure the AR 105 as a DHCP relay or cannot instruct to transmit a PBU to the HA 106 when a DHCP request is received, so that the UE 107 can receive an IP address just allocated by a local DHCP server in the access network 102.

As a result, even though the access network can be actually the home link, the UE 107 recognizes it as a foreign link, and communication involving tunnel overhead is forced. To avoid such a problem, BA transmission may be delayed until the HA 106 can acquire the home link configuration capability information. However, this is not favorable because the communication status quality of the UE 107 may be degraded while waiting for BA reception because it's during the handover processing, and the UE 107 may be disconnected from the access network 101.

In order to solve the above-stated problems, the UE 107, which intends to receive a BA via the access network 101 and start address acquisition processing in the access network 102, retries the acquisition of an address a few times, although the UE 107 typically acquires an address just once with DHCP processing. Then, when the UE 107 can acquire the same address as the home address acquired with the BA, the UE 107 completes the DHCP processing. This can solve the problem of a failure in BA reception and accordingly a failure in home address acquisition because the communication link is disconnected during the delay of the BA or other problem of the communication involving tunnel overhead using a local IP address being forced although the access network actually can be the home link. Further, the above process can eliminate key update processing, so that direct communication using a home address can be performed.

That is, while the HA 106 acquires information (home link configuration capability information) for determination as to whether the target access network for the handover can be configured as the home link or not from a database or the like, the UE 107 transmits (retries) a home address allocation request with a predetermined number of times.

Herein, in the case where the HA 106 does not acquire the home link configuration capability information and so cannot determine whether the target access network for the handover can be configured as the home link or not, the BA to be transmitted may include a flag indicating that the target access network for the handover is being verified whether it can be configured as the home link or not. When receiving the BA with this flag, the UE 107 retries DHCP processing until the home address can be acquired. That is, the HA 106 acquires the information (home link configuration capability information) as to whether the target access network for the handover can be configured as the home link or not from a predetermined server (e.g., HSS/AAA 701), and while the HA 106 is trying to acquire the home link configuration capability information, the flag is added to the BA, the flag indicating that the target access network for the handover is being verified whether the access network can be configured as the home link or not.

Note here that this flag or indication on information similar to that indicated by this flag may be provided to the UE 107 when the UE 107 attaches to the access network 102 or by including the information or the flag in an address acquisition response message, for example, and further indication on a result of home link configuration capability or not may be provided. Thereby, even when it takes time to acquire the home link configuration capability information, such indication may be delayed so as to improve the probability that the UE 107 can acquire the notice.

The maximum value may be provided for the number of times for the UE 107 repeating trials for address acquisition or for the time period when the UE 107 repeats trials. In the case where the HA 106 can acquire the home link configuration capability information to find that the access network 102 cannot be the home link, the HA 106 provides indication to the UE 107 using the BA so that the already acquired IP address is configured as the address used in the access network 102 (for example, a flag for the notice may be provided).

Thereby, even when the number of trials does not reach the predetermined maximum value or the predetermined time period has not elapsed, the address acquisition processing by the UE 107 can be completed, and the IP address already acquired at that time can be configured as the address allocated in the access network 102, and therefore handover processing can be completed in short time.

Figure 3:
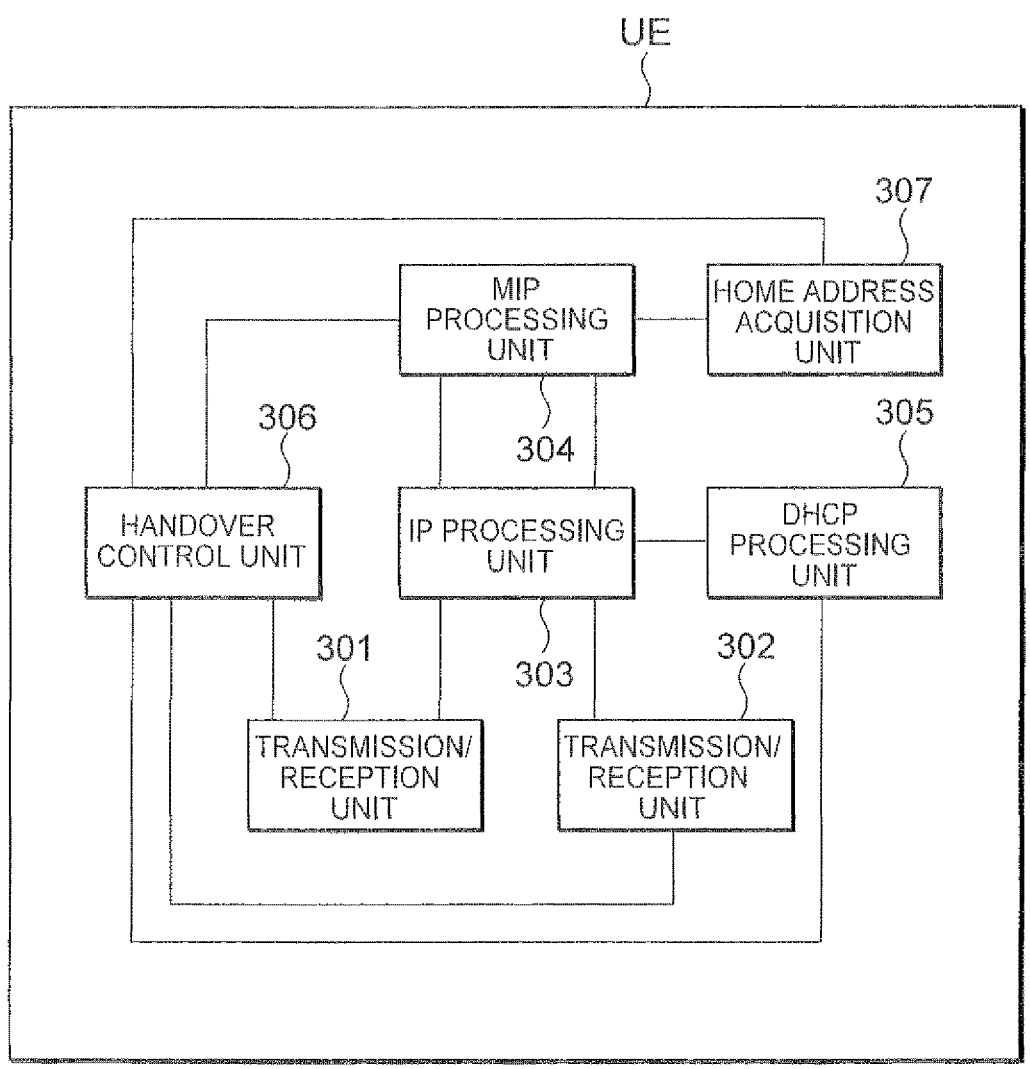
FIG. 3 shows an exemplary configuration of a mobile node according to one embodiment of the present invention.
Figure 5:
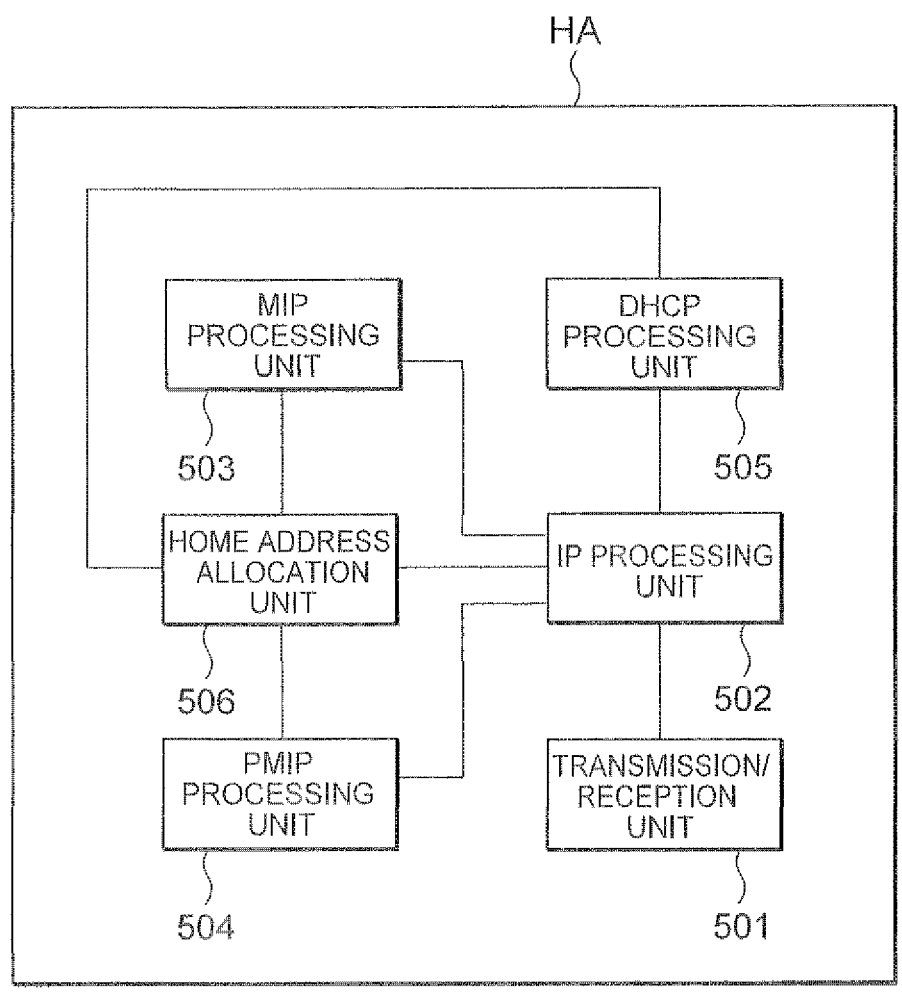
FIG. 5 shows an exemplary configuration of a home agent according to one embodiment of the present invention.

Referring next to FIG. 3 and FIG. 5, exemplary operations of the mobile node UE and the home agent HA according to one embodiment of the present invention are described below. FIG. 3 shows an exemplary configuration of a mobile node according to one embodiment of the present invention. Transmission/reception unit 301 and 302 correspond to communication interfaces for connection with the access networks 101 and 102, respectively, and these units implement communication protocol processing lower than IP layers and modem processing. An IP processing unit 303 implements IP layer processing, and a MIP processing unit 304 implements Mobile IP protocol processing based on DSMIP.

Figure 4:
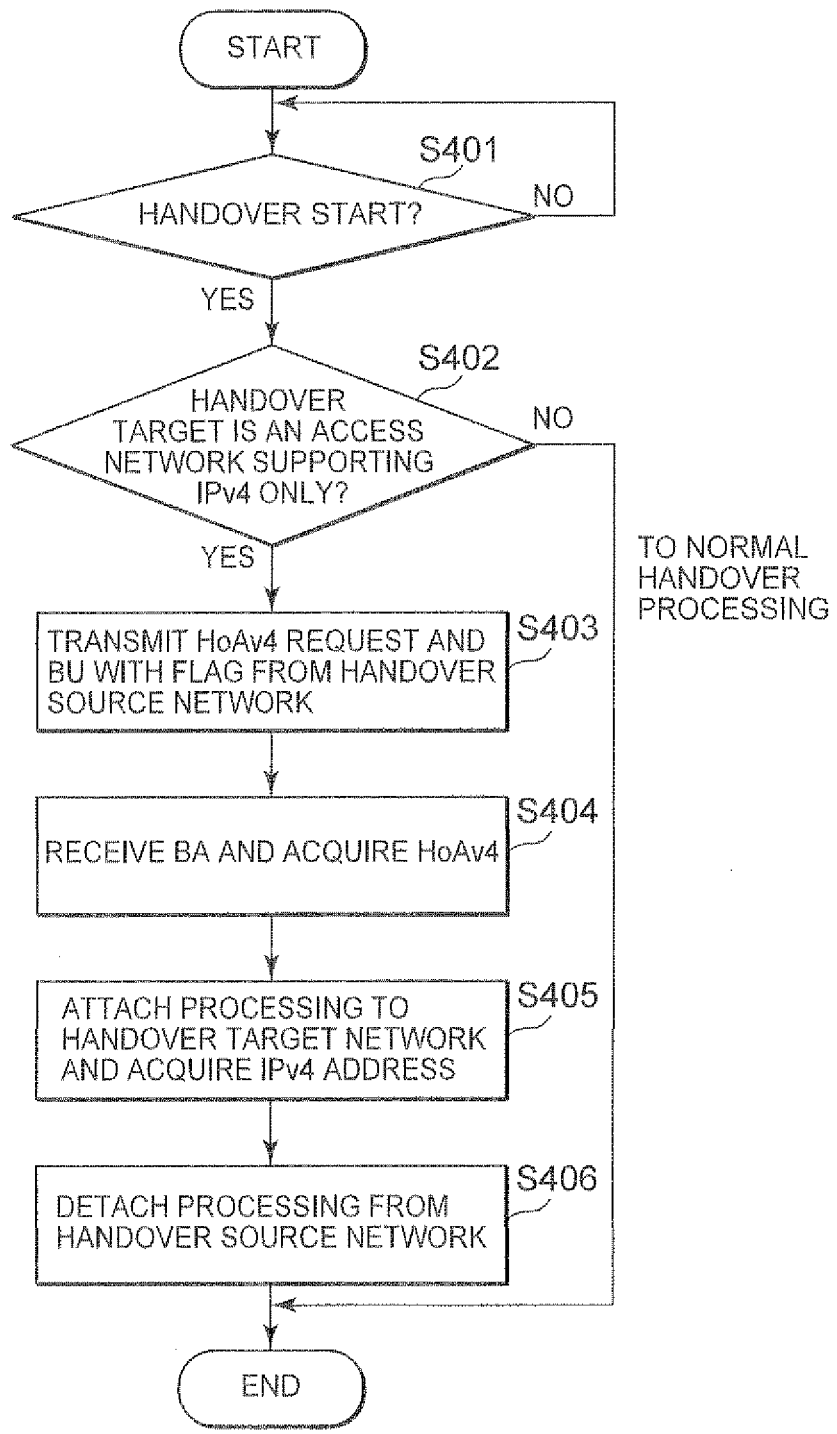
FIG. 4 is a flowchart illustrating an exemplary processing flow in a mobile node in one embodiment of the present invention.

A DHCP processing unit 305 implements DHCP protocol processing (client function). A handover control unit 306 determines or detects the handover feasibility or the timing to perform handover based on a communication status obtained from the transmission/reception unit 301 and 302, transmits instructions to perform handover to the MIP processing unit 304, the transmission/reception unit 301 and 302, the DHCP processing unit 305 and the like to control handover processing. A home address acquisition unit 307 is a characterizing part of the present invention, and an exemplary operation of this unit is described below with reference to FIG. 4, while mentioning the peripheral operations.

The handover control unit 306 determines whether handover starts or not (Step S401). When it is determined that handover starts, the home address acquisition unit 307 receives a start instruction of handover processing from the handover control unit 306, and detects whether the handover target network (access network 102) is an access network supporting IPv4 only or not (Step S402). The detection method has been described above, and so the description thereof is omitted. When it is detected that the handover target network is an access network supporting IPv4 only, the home address acquisition unit 307 instructs the MIP processing unit 304 to transmit a BU to request an IPv4 home address (HoAv4) via the handover source access network (access network 101).

At this time, the MIP processing unit 304 may add, to the BU, information (e.g., a flag) requesting that the address allocating in the handover target network is configured as the home address. The MIP processing unit 304 transmits the BU (with flag) requesting the IPv4 home address (Step S403), and the BU is sent out to the access network 101 via the IP processing unit 303 and the transmission/reception unit 301 and is transferred to the HA 106. As a response, the MIP processing unit 304 receives a BA from the HA 106 via the transmission/reception unit 301 and the IP processing unit 303, acquires the IPv4 home address (HoAv4) contained in the BA (Step S404) and informs the home address acquisition unit 307 of the address.

Receiving this, the home address acquisition unit 307 instructs the handover control unit 306 to start attach processing to the access network 102, and the handover control unit 306 instructs the transmission/reception unit 302 to start the attach processing (Step S405). During the attach processing, when the IP address is allocated from the access network 102, the transmission/reception unit 302 transfers the IP address to the IP processing unit 303 for configuring. In the case where no IP address is allocated during the attach processing but an IP address is acquired using DHCP after completion of the attach processing, the handover control unit 306, receiving the indication of the attach processing completion from the transmission/reception unit 302, instructs the DHCP processing unit 305 to start IP address acquisition.

The DHCP processing unit 305 sends out a DHCP request message to the access network 102 via the IP processing unit 303 and the transmission/reception unit 302, and acquires as a response a DHCP response message including the allocated IPv4 address via the transmission/reception unit 302 and the IP processing unit 303 (Step S405). The thus acquired IP address is configured in the IP processing unit 303. Finally, the handover control unit 306 instructs the transmission/reception unit 301 to start detach processing from the access network 101 (Step S406), and the handover processing ends with the completion of the detach processing. Note here that at Step S402 if the access network is not an access network supporting IPv4 only, normal handover processing is performed. The detach processing (Step S406) may be omitted or may be performed in accordance with an instruction from a network.

As stated above, conventionally, comparison is made between the IP address acquired during the attach processing or by the DHCP processing and the IP address acquired by the home address acquisition unit 307 via the access network 101, and determination is made as to whether the access network can be the home link or not. However, since the request from the UE 107 transmitted at the time of home address acquisition has been accepted, it is guaranteed that the IP address allocated in the access network 102 is identical with the home address, so that the determination on the home link needs not be performed, which is a major feature of the present invention.

Figure 6:
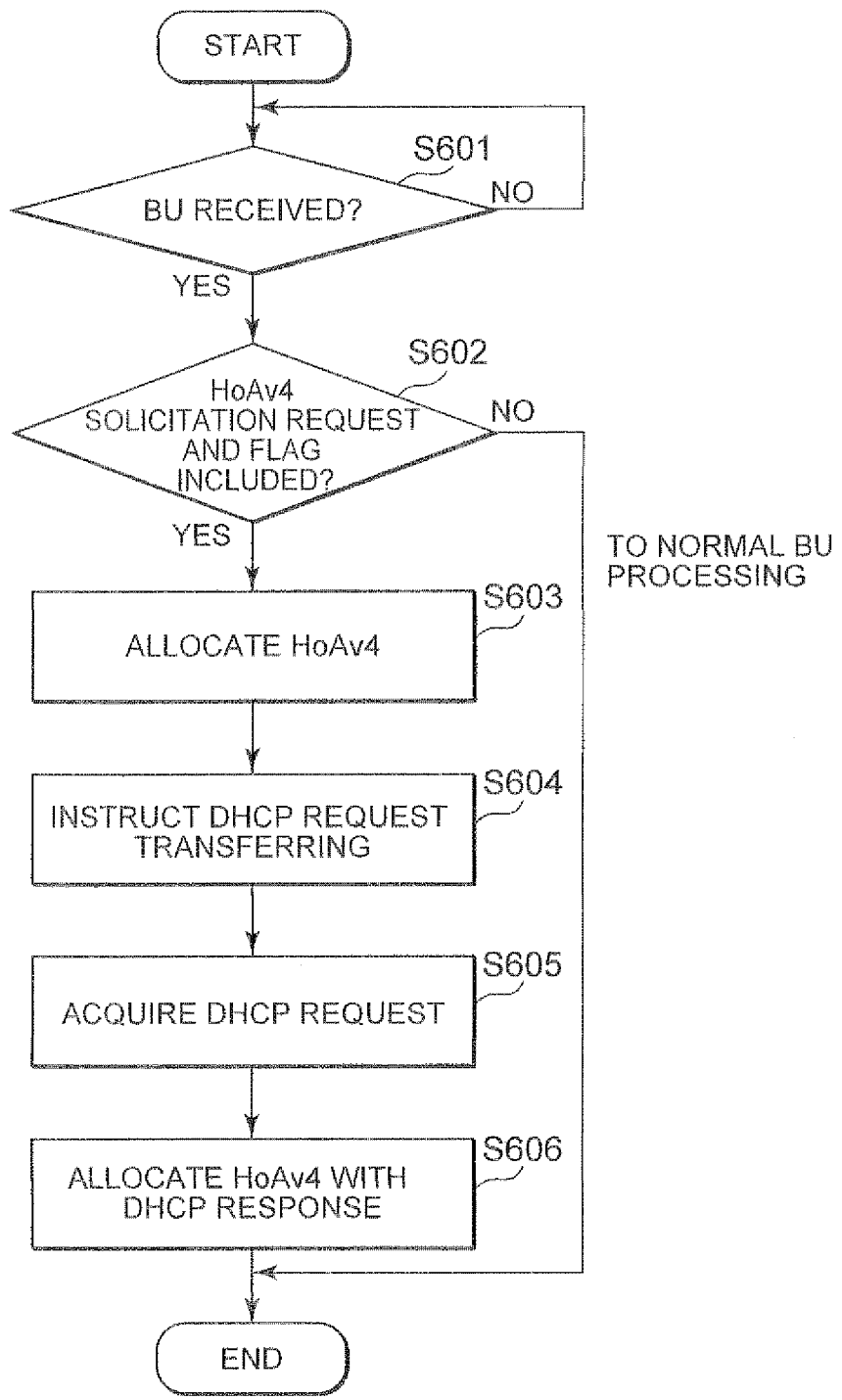
FIG. 6 is a flowchart illustrating an exemplary processing flow in a home agent in one embodiment of the present invention.
Figure 7:
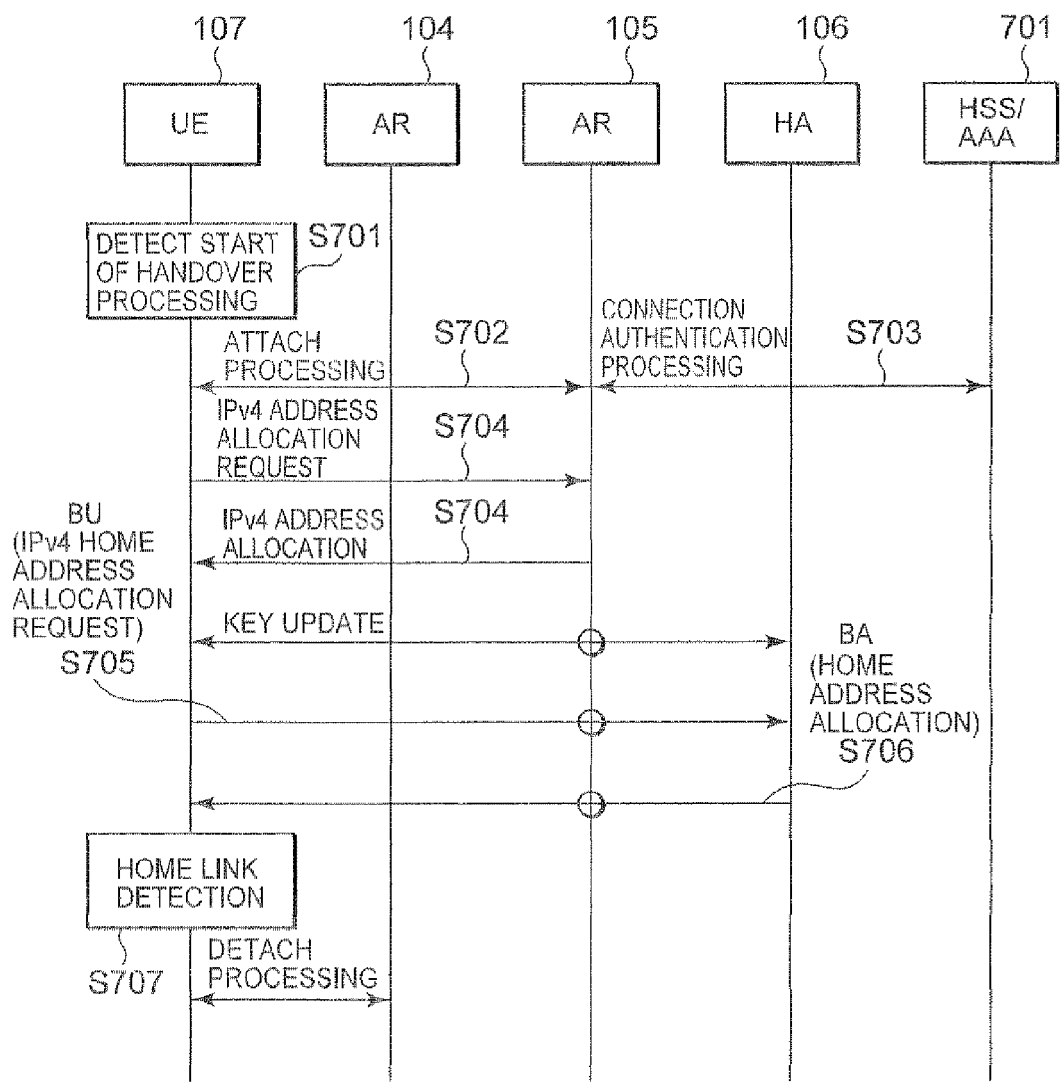
FIG. 7 shows the prior art.

Referring to FIG. 5, the HA according to one embodiment of the present invention is described below. FIG. 5 shows an exemplary configuration of a HA according to one embodiment of the present invention. A transmission/reception unit 501 corresponds to a communication interface for communication with a node in the core network 103 and this unit implements communication protocol processing lower than IP layers and modem processing. An IP processing unit 502 implements IP layer processing, and a MIP processing unit 503 implements Mobile IP protocol processing based on DSMIP. A PMIP processing unit 504 implements PMIP protocol processing. A DHCP processing unit 505 implements DHCP protocol processing (server function). A home address allocation unit 506 is a characterizing part in the present invention, and an exemplary operation of this unit is described below with reference to FIG. 6, while mentioning the peripheral operations.

The MIP processing unit 503 determines whether a BU from the UE 107 is received or not via the transmission/reception unit 501 and the IP processing unit 502 (Step S601). In the case where the BU is received, the presence or not of an allocation request for the IPv4 home address (as well as a flag requesting that the IP address allocated to the UR 107 in the target access network for the handover of the UR 107 is configured as the IPv4 home address allocated here) is checked (Step S602), and if they exist, the home address allocation unit 506 allocates the IPv4 home address (HoAv4) and transmits a BA to the UE 107 (Step S603), while transmitting a message instructing to let the AR 105 operate as a DHCP relay to the authentication server HSS/AAA 701 via the IP processing unit 502 and the transmission/reception unit 501 (DHCP request transfer instruction: Step S604). Receiving this message, the authentication server HSS/AAA 701 issues a desired instruction to the AR 105.

Subsequently, the DHCP request message from the UE 107 that is transferred from the AR 105 is transferred to the DHCP processing unit 505 via the transmission/reception unit 501 and the IP processing unit 502 (DHCP request acquisition: Step S605), and the DHCP processing unit 505 acquires the IP address to be allocated from the home address allocation unit 506, incorporates the IP address in a DHCP response message and transmits the same via the IP processing unit 502 and the transmission/reception unit 501 (HoAv4 allocation: Step S606), and the message is transferred to the UE 107 via the AR 105 operating as the DHCP relay. Herein, the received DHCP request message includes an identifier (e.g., Network Access Identifier: NAI) of the UE 107, so that the HA 106 can identify the DHCP request from the UE 107.

Instead of the message instructing to let the AR 105 operate as the DHCP relay that is issued at the same time as the allocation of the IPv4 home address, the home address allocation unit 506 may transmit a message instructing to issue a PBU to the HA 106 when the AR 105 receives a DHCP request. In this case, the PMIP processing unit 504 receives the PBU message, acquires the home address from the home address allocation unit 506, and contains the address in a PBA message for transmission. In this case also, since the PBU includes an identifier (e.g., NAI) of the UE 107, the HA 106 can identify the address allocation for the UE 107.

The above description describes the case where the mobile node uses the DHCP request message and the DHCP response message to acquire an IP address. The DHCP request message herein refers to a message to start IP address acquisition processing, including a DHCP DISCOVER message in terms of DHCP protocols, or a DHCP REQUEST message when a DHCP server has been clarified or when the transmission of a DHCP DISCOVER message is skipped. The DHCP response message herein refers to a message with which indication on an IP address is provided to a mobile node in the IP acquisition processing, including a DHCP ACK message or a DHCP OFFER message in terms of DHCP protocols. Receiving the DHCP response message, a mobile node can configure the IP address and associating setting values contained in the message in the interface to start communication.

Note that the HA 106 can determine as to whether the access network 102 can be the home link or not based on a policy or a rule (or network environment) concerning QoS and accounting acquired (or arranged in advance) from a policy server such as a Policy and Charging Rule Function (PCRF), for example. For instance, only when the UE 107 subscribes to a plan enabling free designation of a home address (or enabling free designation of a home link), setting is permitted, or when header overhead is to be reduced because of a restriction on communication capacity (decided by a roaming contract or the like) between the core network 103 and the access network 102, the access network with which the UE 107 connects may be positively designated (configured) as the home link.

The HoAv4 allocation request that the UE 107 transmits to the HA 106 via the access network 101 may include an IPv4 address that the UE 107 generates uniquely. In this case, the HA 106 configures the IPv4 address reported from the UE 107 as the actual IPv4 home address (HoAv4) or once allocates a HoAv4 and exchanges (e.g., Network Address Translation: NAT) the IPv4 address reported from the UE 107 with the HoAv4 allocated by the HA 106 in the actual communication, whereby communication between the UE 107 and a foreign node can be implemented.

Before transmitting (Step S203) a BA including the HoAv4 to be allocated to the UE 107, the HA 106 may request from the PCRF the allocation of a policy (or a rule) concerning QoS and accounting for the HoAv4. Further, in response (or at the same timing as Step S204), the PCRF may issue a QoS/accounting policy in the access network 102 to the AR 105. Thereby, communication can be performed based on an appropriate QoS/accounting policy.

The above description especially exemplifies the handover between a 3GPP access network and a non-3GPP access network. However, in the case where attach procedure is not performed as in the handover between 3GPP access networks, and when the network side (e.g., PGW or SGW) determines that the access network 102 is a network supporting IPv4 only and the UE 107 does not have an IPv4 address, indication on the IPv4 address may be provided to the UE 107 (push-notice regardless whether the request from the UE 107 is present or not) using DHCP procedure, for example, at the end of the handover procedure (i.e., after the establishment of a wireless bearer), or indication on the IPv4 address may be provided to the UE 107 during the handover procedure.

As a method of detecting an IP version supported that is carried out by the UE 107, information concerning an IP type supported by the access network 102 may be acquired from a foreign node for use. For instance, information concerning an IP type supported by the access network 102 may be acquired from a server distributing access network information, and comparison may be made with the IP type in the access network before the handover.

The HA 106 may incorporate a flag (e.g., flag Y) in a BA (including the allocated HoAv4) transmitted to the UE 107 via the access network 101, the flag indicating that the address allocated via the access network 102 is the home address. Receiving the BA including the flag Y, the UE 107 recognizes that the target access network 102 for the handover during connection can be the home link, and start communication in the target access network 102 for the handover using the already acquired IPv4 home address (HoAv4) without waiting for the completion of DHCP procedure that has started already (or by omitting DHCP processing supposed to start or although starting the processing, without waiting for the completion thereof). Thereby, waiting time caused by DHCP protocol processing and the load by DHCP protocol processing can be reduced, so that handover time can be reduced.

Note that each functional block used in the description of the above-stated embodiments may be typically implemented as a LSI that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration. A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used. Further, if a technique for integrated circuit that replaces LSIs becomes available by the development of a semiconductor technique or derived techniques, functional blocks may be naturally integrated using such a technique. For instance, biotechnology may be applied thereto.

INDUSTRIAL APPLICABILITY

According to a handover method, and a mobile node and a home agent used in the method of the present invention, tunnel overhead between the mobile node and the home agent can be reduced to improve communication efficiency, and binding processing can be completed before key update processing even when the mobile node performs the key update processing. Therefore, a packet can be transmitted/received in a network as a handover target without waiting for the completion of the key update processing as a time-consuming process, and so the present invention is effective for a handover method in a communication system performing communication while moving between networks supporting different IP versions as well as a mobile node and a home agent used in the method.

The invention claimed is:

1. A handover method for a mobile node moving between at least two networks each supporting a unique and different IP version as a protocol of the mobile node, comprising the steps of:

when the mobile node performs handover from a first access router in a first network currently connecting before handover to a second access router in a second network as a handover target, and when an IP version supported by the second network as the handover target and an IP version supported by the first network before handover are different, a step where the mobile node, not having a home address in the second network as the handover target, transmits a first message to a home agent via the first access router, the first message including an allocation solicitation request for assignment of a home address in the second network as the handover target, and transmits a second message to the home agent via the second access router, the second message being separate from the first message and including an address acquisition request for the home address in the second network as the handover target already allocated to the mobile node, in response to the allocation solicitation request, via the first network before the handover; and a step where the home agent transmits via the first access router a third message to the mobile node based on the allocation solicitation request for assignment of a home address included in the first message, the third message including the allocated home address in the second network as the handover target, and transmits via the second access router a fourth message to the mobile node based on the address acquisition request, the fourth message including the allocated home address in the second network as the handover target.

2. The handover method according to claim 1, wherein the first message includes a request that an address to be allocated in the second network as the handover target based on the address acquisition request is identical with the home address allocated by the allocation solicitation request.

3. The handover method according to claim 1, wherein when the home agent does not have information for determination as to whether the second network as the handover target can be set as a home link or not,
the mobile node transmits the second message including the address acquisition request a predetermined number of times.

4. The handover method according to claim 1, wherein when the home agent does not have information for determination as to whether the second network as the handover target can be set as a home link or not,
the home agent adds a flag to the third message, the flag indicating that determination is being performed as to whether the second network as the handover target can be set as a home link or not.

5. The handover method according to claim 1, wherein
the home agent transmits the third message to the mobile node, the third message further including information indicating that an address allocated in the second network as the handover target is identical with the home address, and
when the mobile node receives the third message including the information, the mobile node starts communication in the second network as the handover target using the home address included in the third message without waiting for reception of the fourth message.

6. A mobile node performing handover between at least two networks each supporting a unique and different IP version as a protocol of the mobile node, the mobile node comprising:
when the mobile node performs handover from a first access router in a first network currently connecting before handover to a second access router in a second network as a handover target,
a determination unit that determines as to whether an IP version supported by the second network as the handover target and an IP version supported by the first network before handover are different or not;
a message generation unit that, when it is determined that the respective IP versions of the first network and the second network are different and the mobile node not having a home address in the second network as the handover target, generates a first message including an allocation solicitation request for assignment of a home address in the handover target and a second message including an address acquisition request for the home address in the second network as the handover target allocated to the mobile node, in response to the solicitation allocation request, via the first network before the handover;
a transmission unit that transmits the generated first message to a home agent via the first access router and transmits the second message, separately from the first message, via the second access router to the home agent; and a reception unit that receives, via the first access router, based on the allocation solicitation request for assignment of a home address included in the first message, a third message including the allocated home address in the second network as the handover target transmitted from the home agent, and receives, via the second access router, a fourth message including the allocated home address in the second network as the handover target transmitted by the home agent based on the address acquisition request included in the second message.

7. The mobile node according to claim 6, wherein the first message includes a request requesting that an address to be allocated in the second network as the handover target is identical with the home address allocated by the allocation solicitation request.

8. The mobile node according to claim 6, wherein the determination unit determines a difference or not of IP versions in the first network and the second network based on at least any one of: information of a predetermined database storing association of networks with information on IP versions supported by the networks; information on a response received or not based on transmission of a predetermined message; information on a predetermined packet detected or not; and information on presence or not of an instruction to acquire an IP address.

9. The mobile node according to claim 6, wherein when the mobile node receives a notice indicating that the home agent does not have information for determination as to whether the second network as the handover target can be set as a home link or not,
the transmission unit transmits the second message including the address acquisition request a predetermined number of times.

10. The mobile node according to claim 6,
wherein
when the reception unit receives the third message further including information indicating that an address allocated in the second network as the handover target is identical with the home address,
the mobile node starts communication in the second network as the handover target using the home address included in the third message without waiting for reception of the fourth message.

11. A home agent of a mobile node, the mobile node performing handover between at least two networks supporting a unique and a different IP version as a protocol of the mobile node, the home agent comprising:
when the mobile node performs handover from a first access router in a first network currently connecting before handover to a second access router in a second network as a handover target, and when an IP version supported by the second network as the handover target and an IP version supported by the first network before handover are different, and the mobile node not having a home address in the second network as the handover target,
a reception unit that receives, from the mobile node, a first message including an allocation solicitation request for assignment of a home address in the second network as the handover target and a second message, separately from the first message, including an address acquisition request for the home address in the second network as the handover target allocated to the mobile node, in response to the allocation solicitation request, via the first network before the handover;
a message generation unit that generates a third message including the allocated home address in the handover target based on the allocation solicitation request for assignment of a home address in the first message and a fourth message including the allocated home address in the second network as the handover target based on the address acquisition request; and a transmission unit that transmits the generated third message via the first access router and the generated fourth message via the second access router to the mobile node.

12. The home agent according to claim 11, wherein the first message includes a request that an address to be allocated in the second network as the handover target is identical with the home address allocated by the allocation solicitation request.

13. The home agent according to claim 12, further comprising acquisition unit that acquires, from a predetermined server, information for determination as to whether the second network as the handover target can be set as a home link or not, wherein when the acquisition unit does not acquire the information, the message generation unit adds a flag to the third message, the flag indicating that determination is being performed as to whether the second network as the handover target can be set as a home link or not.

14. The home agent according to claim 11, wherein the message generation unit generates the third message including information indicating that an address allocated in the second network as the handover target is identical with the home address.

* * * * *